United States Patent

Geber

[15] 3,678,766
[45] July 25, 1972

[54] DRIVE FOR IN-SLOT WINDING MACHINE

[72] Inventor: Eugene E. Geber, Ossian, Ind.
[73] Assignee: Industra Products, Inc., Ft. Wayne, Ind.
[22] Filed: Sept. 30, 1970
[21] Appl. No.: 76,697

[52] U.S. Cl. ..................................74/23, 74/437, 242/1.1 R
[51] Int. Cl. ......................................................F16h 21/00
[58] Field of Search........................74/23, 437; 242/1.1 R

[56] References Cited

UNITED STATES PATENTS

| | | | |
|---|---|---|---|
| 2,777,441 | 7/1949 | Cole | 74/437 |
| 1,278,734 | 9/1918 | Payne | 74/437 |
| 2,934,280 | 4/1960 | Mason | 74/23 |
| 2,949,789 | 8/1960 | Eminger | 242/1.1 R |
| 3,179,346 | 4/1965 | Weis | 242/1.1 R |
| 3,433,421 | 3/1969 | Moore | 74/23 |
| 2,552,572 | 5/1951 | Mikina | 74/437 |

*Primary Examiner*—Milton Kaufman
*Assistant Examiner*—Wesley S. Ratliff, Jr.
*Attorney*—Jeffers and Rickert

[57] ABSTRACT

A mechanical drive arrangement is disclosed for converting rotary motion of one shaft into a combined rotary and axial motion of a second shaft, the latter motion being particularly useful in an automatic stator in-slot winding machine. The drive arrangement has first and second non-circular gears constrained to rotate about fixed axes, a source of energy rotatably driving one of those axes or shafts, and a third gear rotatable about a movable axis and adapted to mesh with each of the first and second gears, the third gear axis being movable parallel to itself in a plane, and a ball and socket linkage between an eccentric point on the third gear and the driven shaft.

12 Claims, 6 Drawing Figures

Patented July 25, 1972 3,678,766

INVENTOR
EUGENE E. GEBER

BY Jeffers and Rickert
ATTORNEYS

Patented July 25, 1972

INVENTOR
EUGENE E. GEBER
BY *Jeffers and Rickert*
ATTORNEYS

Patented July 25, 1972
3,678,766
3 Sheets-Sheet 3
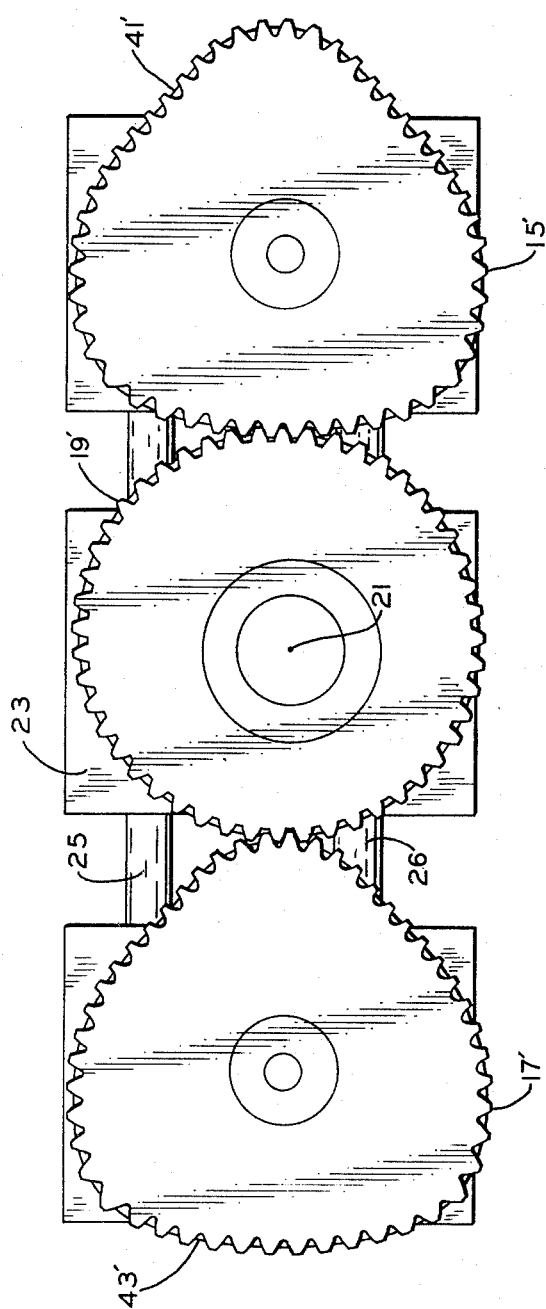
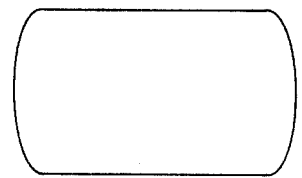
INVENTOR
EUGENE E. GEBER
BY Jeffers and Rickert
ATTORNEYS 3,678,766

DRIVE FOR IN-SLOT WINDING MACHINE

CROSS REFERENCE TO RELATED APPLICATIONS

The present application has utility as a mechanical drive linkage for the winding needle in an in-slot stator winding operation particularly for shaded pole stators and has been particularly useful in conjunction with applicant's copending application entitled "Automatic Tooling For In-Slot Winder" filed Sept. 30, 1970 and bearing Ser. No. 76,862 and assigned to the assignee of the present invention.

BACKGROUND OF THE INVENTION

The present invention relates to a mechanical drive arrangement for converting rotary motion of one shaft into a combined rotary and axial motion of a second shaft and more especially to such a mechanical drive arrangement wherein the second shaft executes its axial motion combined with negligible rotary motion during appropriate portions of its cyclic movement so that this shaft motion may be used in an automatic coil winding machine to effect in-slot winding of a coil in a stator.

The winding head or needle which dispenses the wire in such an in-slot winding operation must execute a substantially linear motion as it passes along one of the slots in the stator and then as it emerges from that stator slot must execute a somewhat semi-circular motion to arrive at another stator slot through which it must pass in the opposite direction in again a linear motion. When it emerges from this second slot another somewhat semi-circular motion is required to get back to the original slot and complete one turn of the coil. After numerous identical passes that particular coil is complete and the winding head or needle may move on to wind another coil within the same stator. The prior art is also aware of multiple needle winding heads which may simultaneously wind two or four coils within a given stator.

Numerous schemes are known in the prior art for effecting this complex winding motion, thus for example, the U.S. Pat. to Mason No. 2,934,280 as best seen in FIG. 7 has a cylindrical shell provided with a slot in which a follower is constrained to move. Such a structure will, of course, give the desired motion, however, the friction between the follower and the motion defining slot may be large and slight amounts of wear in that slot or on the follower soon cause the winding needle to execute erratic motion and the maintenance problems with such a structure are substantial. A somewhat similar device having a slot on the exterior of a rotating drum and a follower which rides in that slot is disclosed in the patent to Nill et al. U.S. Pat. No. 3,025,008 and suffers from basically the same defects as the Mason scheme. Another approach for providing this in-slot winding motion is illustrated in the U.S. Pat. to Ebbert No. 3,276,275 which as illustrated in his FIG. 3 relies on a ball and socket joint wherein the socket has a peculiar and hard to manufacture configuration. All of these prior art schemes for achieving an in-slot winding motion are complicated, expensive to manufacture and require extremely close tolerances which are soon exceeded due to wear.

SUMMARY OF THE INVENTION

The foregoing prior art problems are overcome by the present invention which has a pair of noncircular gears rotating about fixed axes one of which is driven by the power source and between which a third gear rotating about a movable axis migrates in a plane. This third gear either directly or indirectly communicates its motion by an eccentrically located ball and socket joint to the shaft carrying the winding needle.

Accordingly it is one object of the present invention to provide a device for achieving an in-slot winding motion.

It is another object of the present invention to provide a mechanical drive arrangement for converting rotary motion of one shaft into a combined rotary and axial motion of a second shaft.

It is a further object of the present invention to provide a drive mechanism for an in-slot coil winding machine which is durable and virtually maintenance free.

These and other objects and advantages of the present invention will become more apparent from the following detailed disclosure read in conjunction with the accompanying drawing in which:

BRIEF DESCRIPTION OF THE DRAWING

FIG. 4 is a horizontal section similar to FIG. 2 but employing gears of a different and improved configuration;

FIG. 5 is a plane projection of the motion executed by the winding head using the gears of FIG. 2; and FIG. 6 is a plane projection showing the winding head motion using the gears of FIG. 4.

DESCRIPTION OF THE PREFERRED EMBODIMENT

Figure 1:
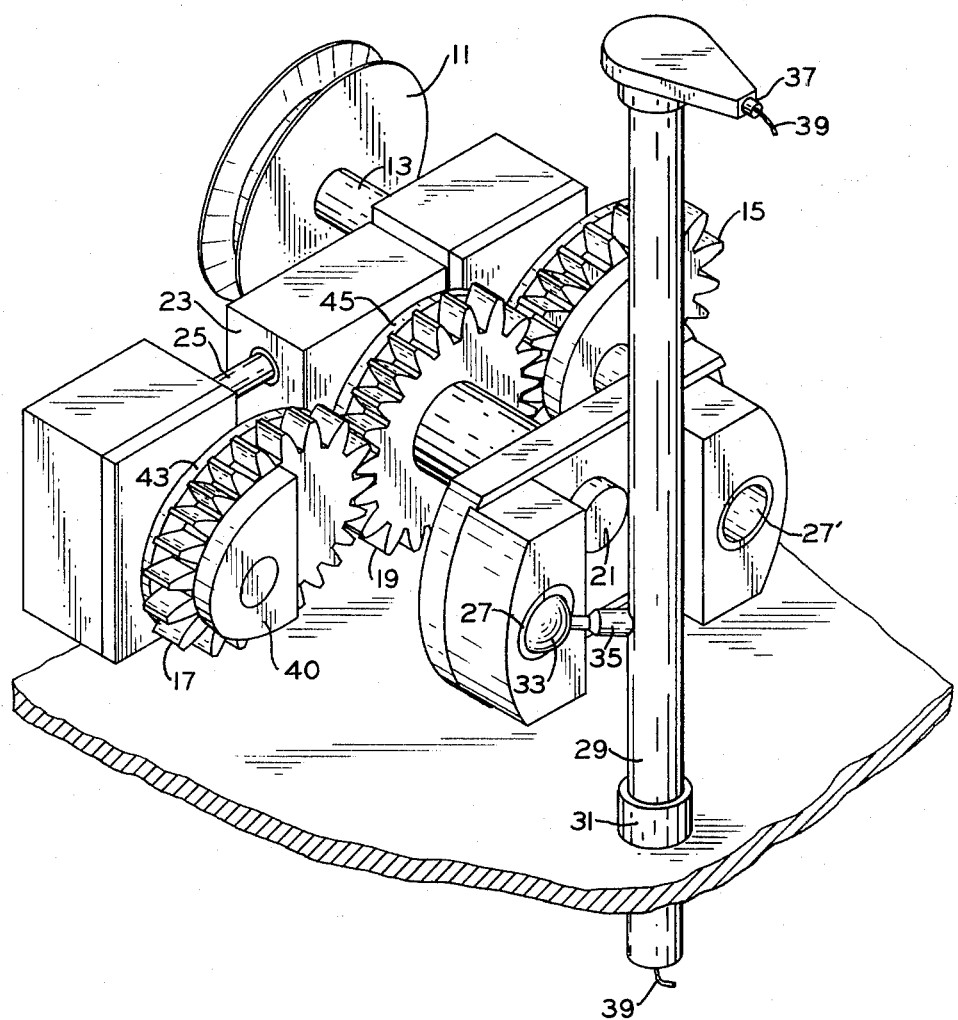
FIG. 1 is a perspective view of the moving parts of the drive arrangement of the present invention.

Turning first to FIG. 1, energy is supplied to the drive arrangement of the present invention in the form of rotary motion by a pulley 11 which would be driven by a V belt connected to a primary source of power. The pulley 11 drives the shaft or axis 13 which in turn is directly coupled to the gear 15. The gear 15 and the matched free running gear 17 are both of a non-circular configuration and both rotate about an axis located at other than the geometrical center of these non-circular gears. A third gear 19 which in the preferred embodiment is circular but could also be noncircular meshes at all times with the two gears 15 and 17 and rotates about an axis 21 which is movable parallel to itself so as to always lie in a plane. This plane motion of the axis 21 of the gear is achieved by providing a support block 23 which is slidable linearly along the rods 25 and 26. Thus, the axis of the gear 19 migrates according to the particular rotational orientation of the two gears 15 and 17. An eccentric point on the gear 19, that is some point off of the axis 21, is provided with a ball socket 27 or 27' which executes a circular motion relative to the shaft or axis 21 at the same time that this axis is migrating in a plane. A second shaft 29 provided with a lower bronze bushing 31 and an upper bronze bushing (not shown) is inherently free to both rotate and slide axially but is coupled to the ball socket 27 by a ball 33 which is rigidly attached to the shaft 29 by a connecting arm 35. The shaft 29 is hollow and provided at its upper end with a winding head or needle 37 so that wire 39 may be fed up through the shaft and out through the winding needle for an in-slot winding operation.

The motion executed by the center of the ball 33 will determine the motion of the winding needle 37 if variations in the length of the connecting arm 35 are taken into account. Assume first that the axis 21 has migrated to its rightmost position as shown in FIG. 1. At this time the center of the ball 33 will lie in the plane of migration of the shaft 21. As the gear 15 rotates in a clockwise direction two things happen, first the gear 19 begins rotating in a counterclockwise direction which by itself will cause the center of the ball 33 to begin a downward motion coupled with motion somewhat to the right. However, the gear 15 is not circular and it also begins to push the shaft 21 toward the left, an amount just enough to compensate for the rightward motion imparted by pure rotation of the gear 19. The result of these two combined effects is a motion of the center of the ball 33 directly downward rather than to the left or right. This portion of the motion of course corresponds to the time when the needle 37 is passing downwardly in one slot of a stator. A similar result of course occurs when the axis or shaft 21 is near its leftmost migration. Thus, while an eccentric point such as represented by the ball socket 27 would normally execute a circular motion about its shaft 21, allowing this shaft to migrate as determined by the configuration of the pair of noncircular gears 15 and 17 tends to flatten out the two sides of this circular motion and cause them to be approximately straight lines to allow the needle 37 to execute linear motion while it is inside one of the stator slots. Thus, the actual motion imparted to the center of the ball 33 and to the winding needle 37 is substantially that shown in FIGS. 8, 9 and 10 of the aforementioned Ebbert patent.

The ball socket 27 or 27' must of course be cylindrical rather than spherical so as to allow the ball 33 to be positioned more deeply in the socket at the uppermost and lowermost positions of the shaft 29. The socket 27' is also an eccentric point relative to the gear 19 however, the distance from the axis 21 to the socket 27' is less than the distance from the axis 21 to the socket 27. Placing the ball 33 in the socket 27' without changing the length of the connecting arm 35 will of course diminish the extent of axial motion of the shaft 29. Similarly, changing the length of the connecting arm 35 for a given distance from the socket to the axis 21 will substantially change the extent of rotary motion of the shaft 29. These two possible adjustments are somewhat interrelated and some care must be taken in selecting the proper eccentric point and proper connecting arm length.

Figure 3:
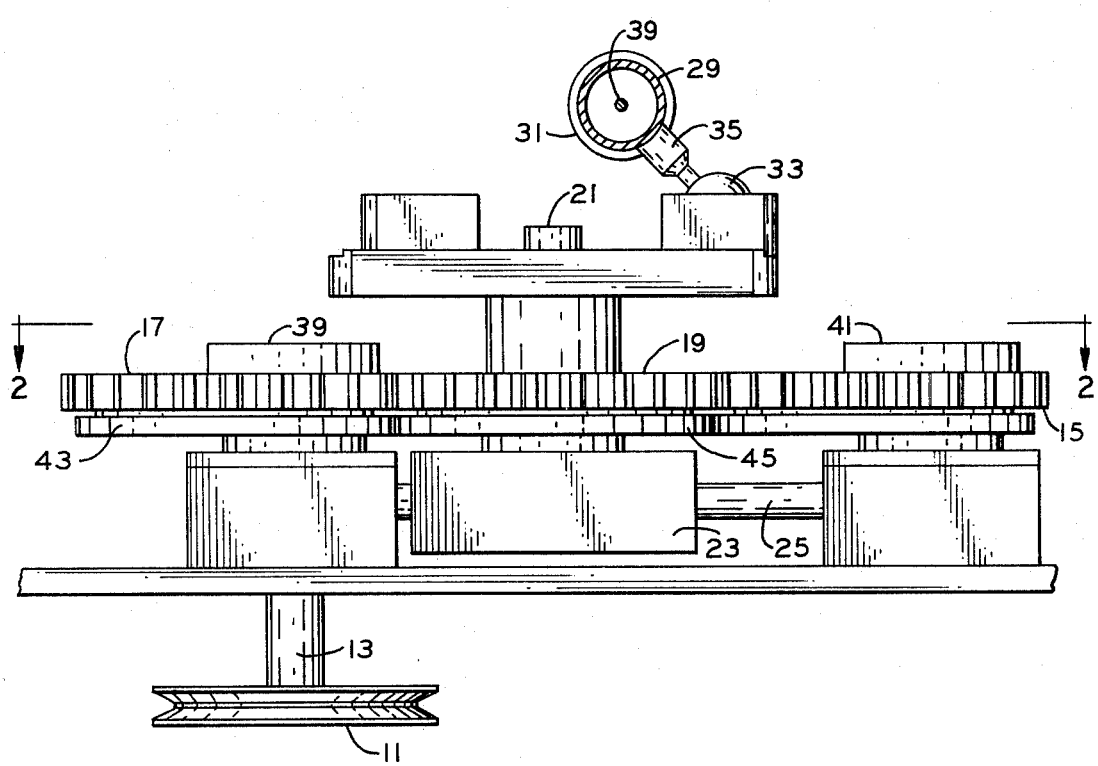
FIG. 3 is a top view of the structure of FIG. 1.

Numerous possible modifications are apparent on the face of FIG. 1, thus the noncircular gears 15 and 17 may be provided with counter weights 40 and 41 so that no imbalance impairs the high speed running of this drive arrangement. Similarly, cams having the same general configuration as the respective gear to which they are attached may be provided so that the lateral forces which must be exerted on the gear 19 are actually exerted on mating cam surfaces such as 43 and 45 rather than on the gear teeth. Such cams will substantially diminish the wear experienced by the gears in this drive arrangement thus prolonging life and diminishing maintenance problems. Similarly, it should be apparent that the rotational motion experienced by the shaft 29 is limited and if it were desired to impart a full 180° rotation to this shaft, a gearing arrangement such as illustrated in FIG. 3 of the aforementioned Ebbert patent would be desirable. Such a gearing arrangement or other scheme would be necessary for example in winding the coils for a two pole machine. Such a gearing arrangement could also be obviously used to vary the extent of rotational movement imparted to the shaft 29 in order to arrive in any desired combination of rotational and axial motion.

Figure 2:
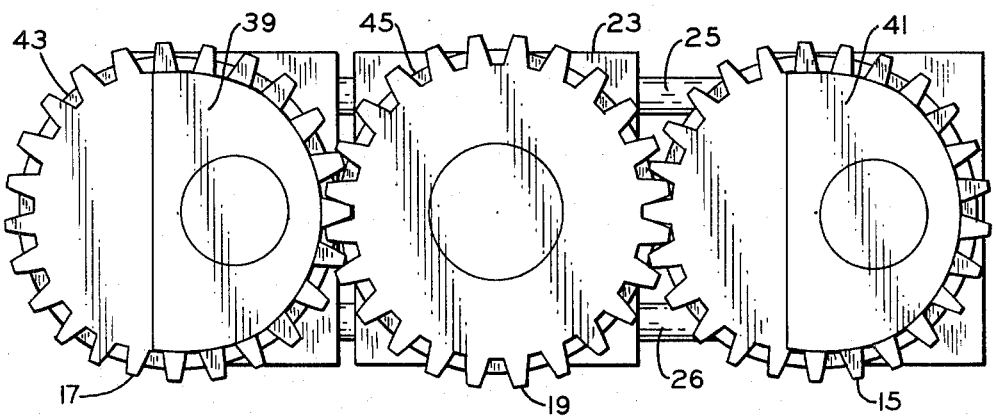
FIG. 2 is a horizontal section illustrating the non-circular gears employed in one embodiment of the present invention.

The specific gear configuration illustrated in FIG. 2 shows the gear 19 as being a circular gear rotating about the center of that circle while the gears 15 and 17 are identical off center noncircular gears both of which are at their extreme leftmost or extreme rightmost position simultaneously. It should be obvious that varying the configuration of the two gears 15 and 17 will result in varying the combined axial and rotational motion of the shaft 29 and indeed by the proper choice of gears most any desired combination of motions might be achieved. The specific configuration illustrated in FIG. 2 imparted to an eccentric point on the gear 19 the motion illustrated as a plane projection in FIG. 5 whereas the configuration illustrated in FIG. 4 wherein the center gear 19' rotates about a point other than its center gave the desired motion illustrated as a plane projection in FIG. 6. As an aid to the reader, the gear configuration shown in FIG. 4 is drawn to scale.

Numerous modifications will suggest themselves to those of ordinary skill in the art and accordingly the scope of the present invention is to be measured only by that of the appended claims.

I claim:

1. A mechanical drive arrangement for converting rotary motion of parallel shafts in a plane into a combined rotary and axial motion of a perpendicular shaft comprising:
   first and second noncircular gears constrained to rotate about fixed axes;
   a third gear rotatable on one of said parallel shafts about a movable axis and in mesh with each of said first and second gears;
   means for limiting the motion of said third gear axis to motion in the plane of said parallel shafts; and
   means connecting said perpendicular shaft to said third gear.

2. The drive of claim 1 wherein said third gear is circular.

3. The drive of claim 1 wherein said connecting means comprises:
   a ball socket attached to said third gear shaft at a point off said movable axis, and a connecting arm extending from said perpendicular shaft and having a ball at the remote end of the arm adapted to fit within the socket.

4. The drive of claim 1 wherein said one shaft is directly coupled to drive said first gear.

5. The drive of claim 1 further comprising means for varying the extent of axial motion of said second shaft.

6. The drive of claim 3 further comprising means for varying the extent of rotary motion of said second shaft.

7. The drive of claim 5 wherein said means for varying comprises means for changing the distance between said eccentric point and said third gear axis.

8. The drive of claim 6 wherein said means for varying comprises means for changing the length of said connecting arm.

9. The drive of claim 3 wherein said perpendicular shaft is provided with a needle adapted to dispense wire in an in-slot winding operation, said needle extending from said perpendicular shaft in a direction perpendicular to said second shaft.

10. The drive of claim 1 wherein said perpendicular shaft is provided with a needle adapted to dispense wire in an in-slot coil winding operation.

11. The drive of claim 1 wherein each of said first, second and third gears is provided with mating cam surfaces for diminishing the wear experienced by the respective gear.

12. A mechanical drive arrangement for converting rotary motion of one shaft into rotary and axial motion of a second shaft comprising:
   a non-circular gear constrained to rotate about a fixed axis of said one shaft;
   a movable gear rotatable about a movable shaft and in mesh with said non-circular gear;
   means for limiting the motion of said movable gear to plane parallel motion of its shaft;
   means for urging said movable gear to mesh with said non-circular gear; and
   means connecting said second shaft to said movable gear at a point removed from the shaft of said movable gear.

* * * * *